US011126234B2

(12) United States Patent
Curatolo et al.

(10) Patent No.: US 11,126,234 B2
(45) Date of Patent: Sep. 21, 2021

(54) SAFE POWER UP GENERATING CIRCUIT HAVING RESET MECHANISM ACTIVATING A CHIP SELECT AND COMMAND SIGNAL

(71) Applicant: Infineon Technologies AG, Neubiberg (DE)

(72) Inventors: Giacomo Curatolo, Unterhaching (DE); Andreas Soukup, Olching (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/843,194

(22) Filed: Apr. 8, 2020

(65) Prior Publication Data

US 2020/0326763 A1 Oct. 15, 2020

(30) Foreign Application Priority Data

Apr. 10, 2019 (DE) .......................... 102019002624.1

(51) Int. Cl.
*G06F 1/24* (2006.01)
*G06F 13/42* (2006.01)
(52) U.S. Cl.
CPC ............ *G06F 1/24* (2013.01); *G06F 13/4282* (2013.01)
(58) Field of Classification Search
CPC ................................ G06F 1/24; G06F 13/4282
See application file for complete search history.

(56) References Cited

U.S. PATENT DOCUMENTS

| 6,868,500 | B1 | 3/2005 | Kutz et al. |
| 7,272,709 | B2 | 9/2007 | Zitlaw et al. |
| 9,882,558 | B1 | 1/2018 | Sun et al. |
| 2008/0238500 | A1 | 10/2008 | Jung |
| 2009/0267682 | A1* | 10/2009 | Hehemann ............ H03K 17/223 |
| | | | 327/530 |
| 2010/0156477 | A1* | 6/2010 | Chellappa ................. G05F 3/30 |
| | | | 327/143 |
| 2020/0195759 | A1* | 6/2020 | Brouse ................ G06F 13/4282 |

OTHER PUBLICATIONS

EP Search Report, EP 10 2019 002 624.1, dated Jan. 30, 2020, pp. 11.

* cited by examiner

*Primary Examiner* — Tammara R Peyton
(74) *Attorney, Agent, or Firm* — Armis IP Law, LLC

(57) ABSTRACT

A method is provided for initializing an electronic circuit in dependence on an externally applied voltage. The electronic circuit contains a first input circuit and further circuit elements. In a first step, a first enable signal for the operation of the input circuit and a further enable signal for the operation of the further circuit elements are deactivated if the voltage falls below a first threshold. In a second step, the first enable signal for the operation of an input circuit is activated and the further enable signal for the operation of the further circuit elements is deactivated if the voltage exceeds the first threshold. This is followed by the reception, with the first input circuit, of a chip select signal for the activation of the electronic circuit and of a code word at a terminal for the command bus. The activation of the further enable signal for the operation of the further circuit elements takes place if the received chip select signal and the received code word have predetermined values.

16 Claims, 3 Drawing Sheets

| Phase | SP1 | VDD @ slave 12 | Interface | Rest of slave 12 |
|---|---|---|---|---|
| 1 | - | <V2 | deactivated | deactivated |
| 2 | - | >V2 | activated | deactivated |
| 3 | CS1=L SP1=code word | >V2 | activated | deactivated |
| 4 | - | >V3 | activated | activated | though it is not a specific point, but the subject of the present invention, but the specific point of the invention, but the specific point, but the specific point, but the specific point.

SAFE POWER UP GENERATING CIRCUIT HAVING RESET MECHANISM ACTIVATING A CHIP SELECT AND COMMAND SIGNAL

RELATED APPLICATION

This application is related to and claims priority to earlier filed German patent application serial number 10 2019 002 624.1, filed on Apr. 10, 2019, the entire teachings of which are incorporated herein by this reference.

BACKGROUND

It is well known, see for example, that a master chip selects the chips controlled by it using a chip select signal, so that said chips can only send signals when at least the master chip has been previously initialized.

BRIEF DESCRIPTION

With electronic circuits, in particular electronic circuits containing digital circuit elements, it must be ensured that they also enter a safe state when the respective system containing the electronic circuit is ramped up. During ramp-up, the voltage powering the electronic circuit is increased, for example starting at 0V, so that above a specific voltage threshold the electronic circuit has sufficient voltage and energy to be operational.

During the voltage ramp-up there may be brief voltage spikes (glitches) or longer-lasting, intermittent voltage drops. This can lead to elements of the electronic circuits already operating and other elements not yet reacting because the voltage for these other elements is not yet sufficient. It is also possible that elements of the electronic circuit initially operate, then temporarily do not operate again when the voltage drops, and then operate again. Different elements of the electronic circuit can react differently. Accordingly, the internal memories of an electronic circuit may be loaded at ramp-up with values that put the electronic circuit in a state not intended for normal operation.

As previously discussed, it is well known, see for example U.S. Pat. No. 7,272,709, that a master chip selects the chips controlled by it using a chip select signal, so that said chips can only send signals when at least the master chip has been previously initialized. However, there is the problem that the initialization of the master chip and the other chips of the system can take different lengths of time. There is also the risk that the master may accidentally send a chip select signal during ramp-up.

It is the object of the invention to provide a device and a method which solve the problems mentioned. This is achieved by the subjects of the independent claims. Advantageous refinements result from the subclaims.

In one embodiment, a method is provided for initializing an electronic circuit in dependence on an externally applied voltage, wherein the electronic circuit comprises a first input circuit, set up to receive at least a chip select signal (CS1) and a signal from a command bus (SPI), and further circuit elements. In a first step, a first enable signal for the operation of the input circuit and a further enable signal for the operation of the further circuit elements are deactivated if the voltage falls below a first threshold.

In a second step, the first enable signal for the operation of an input circuit is activated and the further enable signal for the operation of the further circuit elements is deactivated if the voltage exceeds the first threshold.

This is followed by the reception, with the first input circuit, of a chip select signal for the activation of the electronic circuit and of a code word at a terminal for the command bus. The activation of the further enable signal for the operation of the further circuit elements takes place if the received chip select signal and the received code word have predetermined values.

In one embodiment, the further enable signal is only activated if the voltage exceeds a second threshold (V3) which is greater than the first threshold (V2).

Furthermore, a corresponding electronic circuit that can perform the presented method is presented.

One embodiment includes a method of initializing an electronic circuit depending on an externally applied voltage, the electronic circuit including a first input circuit operative to receive a chip select signal and a command signal from a command bus, the electronic circuit further including circuit elements, the method comprising:

a) deactivating a first signal (Reset1) applied to the first input circuit and deactivating of a second signal (Reset3) to enable the circuit elements in response to detecting that the applied voltage falls below a first threshold voltage (V2);

b) activating the first signal (Reset1) applied to the first input circuit and deactivating the second signal (Reset3) applied to the circuit elements in response to detecting that the applied voltage exceeds the first threshold voltage;

c) receiving, via the first input circuit, a chip select signal that activates the electronic circuit and of a code word at a terminal for the command bus; and d) activating a release enable signal applied to the circuit elements in response to detecting that the received chip select signal and the code word have are set to predetermined values.

Further embodiments herein include activating the release enable signal in response to detecting that the applied voltage exceeds a second threshold voltage (V3), which is greater than the first threshold voltage (V2).

In accordance with further example embodiments, the signal from the command bus is transmitted via a bus line, which is set up for connecting supplemental electronic circuits.

In yet further example embodiments, the bus line is driven by a bus according to SPI (Serial Interface Protocol).

In accordance with further example embodiments, the supplemental circuit elements include memory or voltage generators for memory.

In still further example embodiments, the circuit elements in the electronic circuit include drivers operative to drive output terminals of the electronic circuit.

In further example embodiments, the method includes: outputting a status signal to an output terminal, the status signal indicating completion of initialization of the circuit elements.

In accordance with further example embodiments, the code word is a sequence of at least 8 bits.

Embodiments herein an electronic circuit powered by an externally applied voltage, the electronic circuit comprising: a first input circuit operative to receive a chip select signal and a command signal from a command bus; circuit elements; a first control circuit operative to: i) deactivate a first control signal (Reset1), applied to the first input circuit and deactivate a second control signal (Reset3) applied to the circuit elements in response to detecting that the applied voltage falls below a first threshold voltage; ii) and ii) activate the first control signal (Reset1) applied to the first input circuit and deactivate the second control signal (Reset3) applied to the circuit elements in response to detecting that the applied voltage exceeds the first threshold voltage; an activation circuit operative to activate, via a release control signal, the circuit elements in response to detecting that the chip select signal received by the first input circuit is set to a predetermined value and the command signal received from the command bus is set to a predetermined code word.

In further example embodiments, activation of the electronic circuit occurs in response to detecting that the applied voltage exceeds a second threshold voltage, the second threshold voltage being greater than the first threshold voltage.

In still further example embodiments, the command signal from the command bus is transmitted via a bus line which is set up for connecting the circuit elements.

In yet further example embodiments, the bus line is driven by a bus according to a SPI (Serial Interface Protocol); the circuit elements include memory or voltage generators for memory.

In accordance with further example embodiments, the circuit elements include drivers for output terminals of the electronic circuit.

Still further embodiments herein include an output terminal operative to output a status signal indicating completion of the initializing of the circuit elements.

In one embodiment, the code word is a sequence of at least 8 bits.

Thus, a method/circuit is provided for initializing an electronic circuit in dependence on an externally applied voltage. The electronic circuit contains a first input circuit and further circuit elements. In a first step, a first enable signal for the operation of the input circuit and a further enable signal for the operation of the further circuit elements are deactivated if the voltage falls below a first threshold. In a second step, the first enable signal for the operation of an input circuit is activated and the further enable signal for the operation of the further circuit elements is deactivated if the voltage exceeds the first threshold. This is followed by the reception, with the first input circuit, of a chip select signal for the activation of the electronic circuit and of a code word at a terminal for the command bus. The activation of the further enable signal for the operation of the further circuit elements takes place if the received chip select signal and the received code word have predetermined values.

Figure 1:
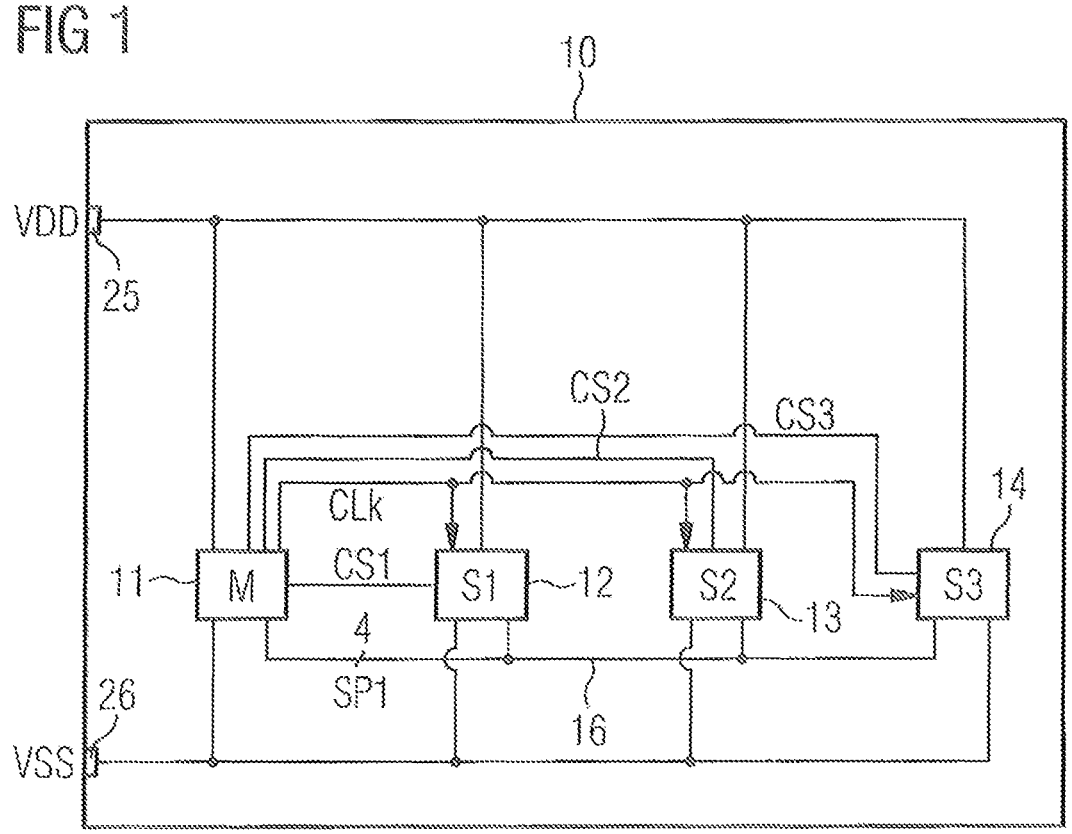
FIG. 1 shows a system in which the presented method can be used for initialization.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

FIG. 1 shows a system 10, for example a consumer electronics product, which contains a master 11 and a plurality of slaves 12, 13 and 14. The master 11 and the slaves 12, 13 and 14 are each electronic circuits. In the present case they are each designed as integrated circuits, also called chips. The System 10 is connected at two of its terminals 25 and 26 to a power supply that is operated by a switched-mode power supply, for example. This switched-mode power supply outputs a voltage between the potentials VDD and VSS of 0 V when not in operation and a voltage of, for example, 3 V when in operation. During system ramp-up, the voltage increases from 0 V to 3 V, but the above-mentioned voltage spikes, both positive and negative, and the longer-lasting temporary voltage dips can and often do occur. The electronic circuits 11, 12, 13 and 14 are each connected to the terminals 25 and 26, from which they are supplied with electrical energy.

In addition, the master 11 and the slaves 12, 13 and 14 are connected to each other via the SPI bus 16, via which they interchange data. Here, the SPI bus 16 has a width of 4, which means that it has 4 parallel lines.

The master 11 is also connected to the slave 12 via the chip select line CS1, with which the master 11 selects or does not select the slave 12. Likewise, the master 11 is connected to the slave 13 via the chip select line CS2 and to the slave 14 via the chip select line CS3 accordingly, so that these slaves are each selected or not selected by the master 11. Selection means that the slaves are ready to receive and send data. Even in the unselected state, the slaves carry out basic functions, for example by keeping the respective internally generated voltages at the desired level and remaining in a predetermined operating state. In addition, they must leave at least elements of the input circuit in operation in the unselected state in order to recognize when they are selected again. In addition, the master 11 drives a clock signal CLK, which all slaves 12, 13 and 14 receive at their respective clock inputs.

Figure 2:
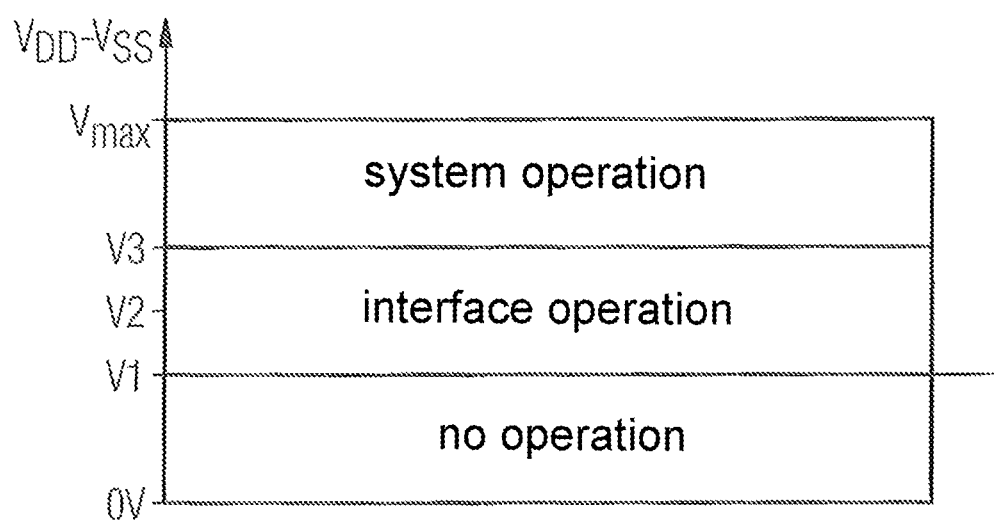
FIG. 2 shows the switching thresholds that are used to initialize an electronic circuit.

FIG. 2 shows the voltage ranges in which the slaves, in this case the slave 12, from FIG. 1 operate. In the range from 0 V to V1, the respective slave is not in operation. The voltage V1 is also called "minimum voltage for interface operation". From the voltage V1 upward, the circuit elements with which the slave can receive and evaluate at least selected input signals can be operated.

However, a slightly higher voltage is required to be sure that operation is safe under all conditions, for example at all different temperatures. For this purpose, the threshold voltage V2 is provided, which is called "voltage for interface activation" and at which the slave is activated to receive selected signals. However, if the voltage is greater than or equal to the threshold voltage V2, not all elements of the slave are activated because specific areas of the slave, for example areas with analog circuits for the operation of an internal memory, do not yet safely operate.

In a first embodiment there is a further threshold voltage V3, called "minimum voltage level". From this threshold voltage V3 upward, the entire slave is safely functional and operation of the entire slave 12 can begin. in FIG. 2, the term slave is used only as an example. A corresponding method can be used for any electronic circuit, especially a semiconductor component, with an external power supply and an input interface.

In a second embodiment, alternative to that of FIG. 2, system operation already starts from the threshold voltage V2.

Figures 3, 4:
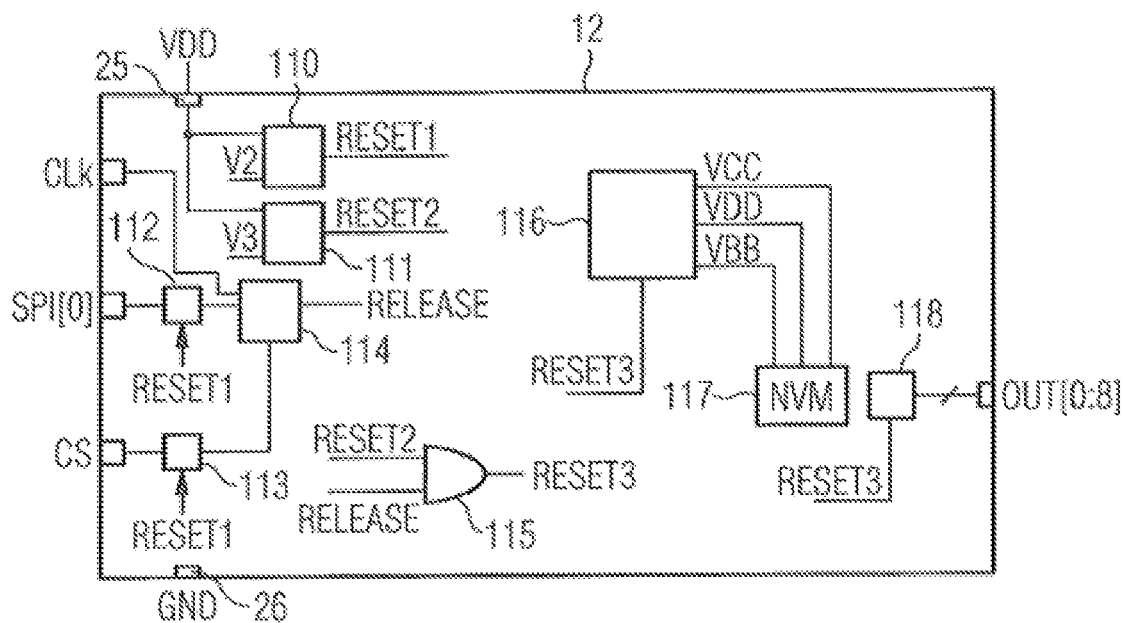
FIG. 3 shows the different phases to initialize the electronic circuit.
FIG. 4 shows circuit details of an electronic circuit from FIG. 1 according to a first embodiment.

FIG. 3 shows different phases of the implementation of the first embodiment in a table. In the first phase, the external supply voltage is below the threshold voltage V2. In this phase, both the input terminals for the interface and the rest of the slave are deactivated. This is to ensure that the slave does not enter a state that is not intended for the slave. In an unintended state, it is possible that the chip will output signals that cause interference in other chips, and/or the chip will not come out of the unintended state again without completely running down the voltage to 0V.

Upward of a threshold voltage V1, which is lower than V2, the chip might already be operational, but operation would not be guaranteed under all circumstances. For this reason, the system waits until the voltage exceeds the threshold voltage V2.

In some embodiments, when the input circuit is deactivated, only the forwarding of the received signal is blocked, but the received signal is evaluated internally in the first input circuit. In alternative embodiments, the input circuit is switched off completely.

If the threshold voltage V2 is exceeded, phase 2 begins, in which at least the first input circuit used to receive at least selected interface signals is activated. Activated here means that the circuit is made functional, i.e. it has voltage applied to it or is enabled by means of exemplary digital enable signals (Reset). This means that the first input circuit is ready to receive signals and forward them at the output of the input circuit.

The rest of the chips, especially the analog elements for operating the internal memory, remain deactivated during this phase. This serves to prevent, in particular, erroneous data from being written to non-volatile memory, as this could permanently damage the function of the system 10.

In this exemplary embodiment, two circuit elements are described which are activated by different enable signals. It is also possible that there are additional circuit elements activated by additional enable signals.

In the next phase 3, the interface has received a logic 0 from the line CS1, which in this case means that the slave 12 is selected. In addition, the input interface has received from the SPI bus 16 a signal for which a specific code word was received on line [0] of the SPI bus 16. The code word consists of a bit sequence of 8 bits, e.g. "0101 0110". The rest of the lines of the SPI bus 16 are ignored. This means that the slave 2 should be fully activated if the voltage in the slave 12 is sufficiently high. Thus, in the first embodiment, in phase 4, if it has been detected in the slave 12 that the voltage is higher than the level V3, the rest of the slave 12 is also activated.

The present method ensures that the slave 12 is fully activated if the master has also accordingly requested this. Otherwise there would be the risk that the slave is already activated but the master does not have sufficient voltage and therefore sends meaningless commands. The present method allows all of the chips to be ramped up in an orderly manner. The image additionally received and evaluated by the SPI interface increases safety. In other embodiments, it is possible to evaluate more bits of the SPI bus to further increase safety.

FIG. 4 shows a possible implementation of the proposed method in a slave 12. It shows a selection of the input terminals of the slave 12, namely the terminals for the power supply VDD and GND and the terminal for the clock CLK, the terminal CS for the chip select line and one terminal from the four terminals of the command bus SPI. The slave 12 contains a first comparator 110 and a second comparator 111, wherein the first comparator 110 outputs a logic 1 with the level VDD on the line Reset 1 and thus activates the first enable signal Reset1 if the supply voltage VDD is greater than V2. Similarly, the comparator 111 outputs a logic 1 with the voltage level VDD if this voltage VDD is greater than V3.

The comparison voltages for the comparators 110 and 111 can be generated, for example, by means of bandgap voltage generators in the slave 12.

The line Reset1 is connected to the first input circuits 112 and 113 for the terminals CS and SPI [0]. These first input circuits 112 and 113 are enabled, i.e. they forward the signal received at their inputs SPI[0] to their respective outputs when Reset1 signals a logic 1. The outputs of this circuit 112 and 113 are connected, among other things, to a switch mechanism 114. This switch mechanism 114 receives a clock signal CLK from the corresponding input terminal of the slave 12 and the signals from the first input circuits 112 and 113. If the signal CS1 is 0 and SPI[0] is a specific code word of four consecutive bits, the switch mechanism 114 switches the signal Release to 1.

The first comparator 110 can be referred to as the first enabling circuit and the second comparator 111 can be referred to as the second enabling circuit. The activation circuit contains the switch mechanism 114 and the AND gate 115. The circuits 116, 117 and 118, which are enabled by the further enable signal 3, can be referred to as further circuit elements, but may also include other circuits not listed here. In addition to the circuit blocks shown in FIG. 4, there may also be numerous other circuit blocks.

Because bus signals are used, no further lines which would increase the cost of the system are required besides the already existing lines. In addition, the master can decide in which order to control the slaves. For example, the slaves it needs first can be activated by it first if it wants to prevent temporary voltage dips when all slaves initialize at the same time and all of them require a lot of current at the same time.

If the supply voltage VDD is greater than V2 and the command to activate the circuit has been detected by the first input circuit, the level on the Release line changes to logic 1, which corresponds to a voltage level of VDD. If logic 1 is present on the Reset2 and Release lines, the signal Reset3 is also set to logic 1 by means of the AND gate 115. This further enable signal Reset3 is thus activated and switches on the internal voltage generator 116, which generates the internal voltages VCC, VPP and VBB for the internal memory 117. In addition, the signal Reset3 also enables the output drivers 118, so that these output drivers can drive signals on the outputs OUT[0:8]. On the other hand, if the line Reset 3 is at logic 0, the outputs OUT[0:8] are each at high impedance and the internal voltage generator 116 is off.

In one embodiment, the slave 12 does not signal to the master 11 when it has finally initialized all circuit elements. The master 11 must then be programmed so as, after activation by the CS1 signal and sending of the SPI code word to activate the circuit, it waits a predetermined time before it accesses the slave 12.

In an alternative embodiment, the slave 11 signals the end of the initialization process to the master, for example also via the SPI interface, after the slave 12 has internally measured that the necessary voltages have reached their target value.

Figure 5:
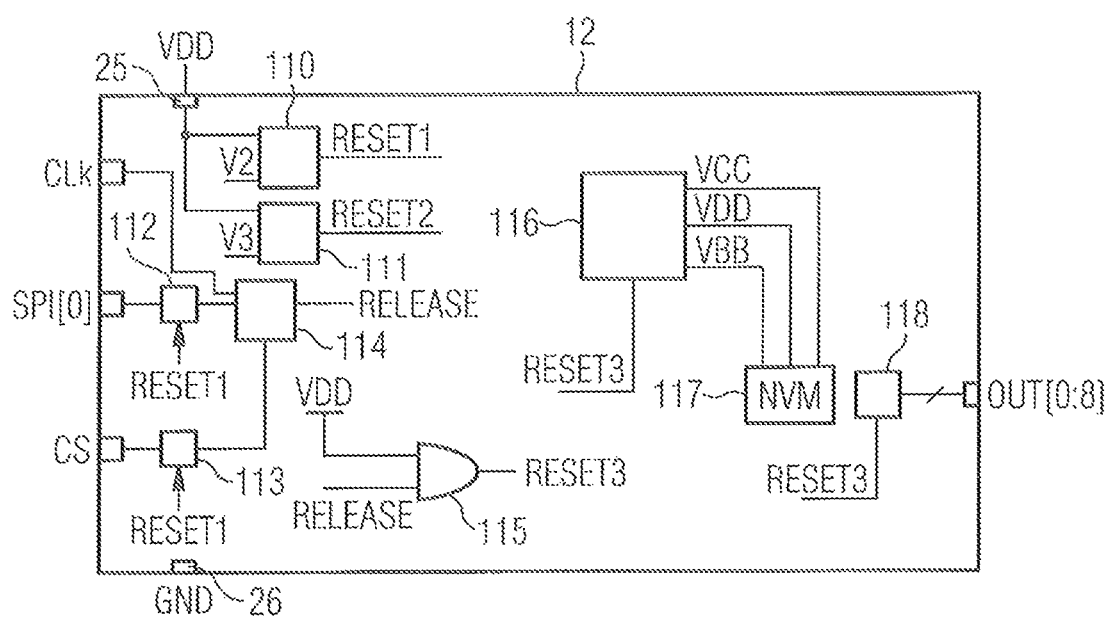
FIG. 5 shows circuit details of an electronic circuit from FIG. 1 according to a second embodiment.

FIG. 5 shows the implementation of the electronic circuit according to a second embodiment. The AND gate receives the signal Release and the level VDD. Thus, the output signal of the AND gate 115 corresponds to the signal Release. If logic 1 is present on the Release line, the signal Reset3 is also set to logic 1 using the AND gate 115. This means that there is no wait until the threshold voltage V3 is reached, but rather a supply voltage greater than or equal to V2 is sufficient to enable and thus operate the other circuits.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method of initializing an electronic circuit depending on an externally applied voltage, the electronic circuit including a first input circuit operative to receive a chip select signal and a command signal from a command bus, the electronic circuit further including circuit elements, the method comprising:
   a) deactivating a first signal (Reset1) applied to the first input circuit and deactivating of a second signal (Reset3) to enable the circuit elements in response to detecting that the applied voltage falls below a first threshold voltage (V2);
   b) activating the first signal (Reset1) applied to the first input circuit and deactivating the second signal (Reset3) applied to the circuit elements in response to detecting that the applied voltage exceeds the first threshold voltage;
   c) receiving, via the first input circuit, a chip select signal that activates the electronic circuit and a code word at a terminal for the command bus; and
   d) activating a release enable signal applied to the circuit elements in response to detecting that the received chip select signal and the code word are set to predetermined values.

2. The method as in claim 1, wherein activating the release enable signal occurs in response to detecting that the applied voltage exceeds a second threshold voltage (V3), which is greater than the first threshold voltage (V2).

3. The method as in claim 2, wherein the signal from the command bus is transmitted via a bus line, which is set up for connecting supplemental electronic circuits.

4. The method as in claim 3, wherein the bus line is driven by a bus according to SPI (Serial Interface Protocol).

5. The method as in claim 1, wherein the supplemental circuit elements include memory or voltage generators for memory.

6. The method as in claim 1, wherein the circuit elements in the electronic circuit include drivers operative to drive output terminals of the electronic circuit.

7. The method as in claim 1 further comprising: outputting a status signal to an output terminal, the status signal indicating completion of initialization of the circuit elements.

8. The method as in claim 1, wherein the code word is a sequence of at least 8 bits.

9. An electronic circuit powered by an externally applied voltage, the electronic circuit comprising:
   a first input circuit operative to receive a chip select signal and a command signal from a command bus;
   circuit elements;
   a first control circuit operative to: i) deactivate a first control signal (Reset1), applied to the first input circuit and deactivate a second control signal (Reset3) applied to the circuit elements in response to detecting that the applied voltage falls below a first threshold voltage; and ii) activate the first control signal (Reset1) applied to the first input circuit and deactivate the second control signal (Reset3) applied to the circuit elements in response to detecting that the applied voltage exceeds the first threshold voltage;
   an activation circuit operative to activate, via a release control signal, the circuit elements in response to detecting that the chip select signal received by the first input circuit is set to a predetermined value and the command signal received from the command bus is set to a predetermined code word.

10. The electronic circuit as in claim 9, wherein activation of the electronic circuit occurs in response to detecting that the applied voltage exceeds a second threshold voltage, the second threshold voltage being greater than the first threshold voltage.

11. The electronic circuit as in claim 10, wherein the command signal from the command bus is transmitted via a bus line which is set up for connecting the circuit elements.

12. The electronic circuit as in claim 11, wherein the bus line is driven by a bus according to a SPI (Serial Interface Protocol).

13. The electronic circuit as in claim 9, wherein the circuit elements include memory or voltage generators for memory.

14. The electronic circuit as in claim 9, wherein the circuit elements include drivers for output terminals of the electronic circuit.

15. The electronic circuit as in claim 9 further comprising: an output terminal operative to output a status signal indicating completion of the initializing the circuit elements.

16. The electronic circuit as in claim 9, wherein the code word is a sequence of at least 8 bits.

* * * * *